United States Patent [19]

Denzinger et al.

[11] 4,282,342

[45] Aug. 4, 1981

[54] PREPARATION OF TERPOLYMERS

[75] Inventors: Walter Denzinger, Speyer; Claus Cordes, Weisenheim, both of Fed. Rep. of Germany

[73] Assignee: BASF Aktiengesellschaft, Fed. Rep. of Germany

[21] Appl. No.: 72,985

[22] Filed: Sep. 6, 1979

[30] Foreign Application Priority Data

Sep. 18, 1978 [DE] Fed. Rep. of Germany ....... 2840502

[51] Int. Cl.$^3$ .......................................... C08F 222/06
[52] U.S. Cl. ....................................... 526/272; 526/68
[58] Field of Search .................................. 526/272, 68

[56] References Cited

U.S. PATENT DOCUMENTS

| Re. 28,475 | 7/1975 | Blecke et al. | 526/272 |
|---|---|---|---|
| 2,378,629 | 6/1945 | Hanford | 526/272 |
| 2,430,313 | 11/1947 | Vana | 526/272 |
| 3,336,267 | 8/1967 | Zimmerman et al. | 526/272 |
| 3,341,622 | 9/1967 | Leibson et al. | 526/68 |
| 4,048,422 | 9/1977 | Sackmann et al. | 526/272 |

OTHER PUBLICATIONS

Die Angewandte Makromolekulare Chemie, 69, 1978, pp. 141–156.

*Primary Examiner*—John Kight, III
*Attorney, Agent, or Firm*—Keil & Witherspoon

[57] ABSTRACT

Terpolymers which have Fikentscher K-values of from 8 to 100 and comprise 50 mole percent of maleic anhydride units, from 35 to 45 mole percent of 2,4,4'-trimethylpent-1-ene units and from 5 to 15 mole percent of 2,4,4'-trimethylpent-2-ene units, and processes for their preparation by polymerizing 50 parts by weight of maleic anhydride, from 35 to 180 parts by weight of 2,4,4'-trimethylpent-1-ene and from 0.6 to 6 parts by weight of 2,4,4'-trimethylpent-2-ene per part by weight of 2,4,4'-trimethylpent-1-ene employed, in the presence of a free-radical initiator at from 60° to 200° C. and a pressure of from 1 to 20 bar, and separating the terpolymers from the unconverted monomers.

3 Claims, No Drawings

PREPARATION OF TERPOLYMERS

The present invention relates to terpolymers of maleic anhydride, hereafter also referred to as MA, 2,4,4'-trimethylpent-1-ene and 2,4,4'-trimethylpent-2-ene.

The preparation of copolymers of maleic anhydride with 1-olefins by mass polymerization, solution polymerization, precipitation polymerization and suspension polymerization, using free-radical initiators, is known. Thus, U.S. Pat. No. 2,378,629 discloses the preparation of copolymers of maleic anhydride with 1-olefins, which may or may not be in excess, by block polymerization or solution polymerization. Further, U.S. Pat. No. 2,430,313 discloses the preparation of maleic anhydride and 1-olefins by precipitation polymerization in an inert solvent. U.S. Pat. No. 3,729,451 describes the dispersion polymerization of 1-olefins of 4 to 14 carbon atoms and maleic anhydride in an excess of the 1-olefin employed, using, as the dispersant, a copolymer of maleic anhydride and 1-olefins of 14 to 18 carbon atoms, and German Laid-Open Application DOS No. 2,501,123 proposes the suspension polymerization of maleic anhydride and 1-olefins of 2 to 8 carbon atoms in the presence of special dispersants, such as the half-esters and/or half-amides of the copolymers with higher alcohols and higher amines respectively.

Ange. Makromol. Chem. 69 (1978), 141-156, especially 153-154, discloses the preparation of copolymers from MA and an excess of a diisobutylene mixture which comprises about 75% by weight of 2,4,4'-trimethylpent-1-ene and about 25% by weight of 2,4,4'-trimethylpent-2-ene.

However, these processes only give copolymers which contain MA units and 2,4,4'-trimethylpent-1-ene units.

These results are entirely in conformity with previous results according to which 2-olefins, especially 2,4,4'-trimethylpent-2-ene, copolymerize only very slightly, if at all, with MA under free-radical polymerization conditions.

It is an object of the present invention to prepare copolymers of MA which also contain 2,4,4'-trimethylpent-2-ene as copolymerized monomer units, since there is a need also to utilize the 2-isomer commercially.

We have found that this object is achieved, surprisingly, by preparing terpolymers of MA, 2,4,4'-trimethylpent-1-ene and 2,4,4'-trimethylpent-2-ene in accordance with the invention. The terpolymers have Fikentscher K-values of from 8 to 100 and comprise 50 mole percent of maleic anhydride units, from 35 to 45 mole percent of 2,4,4'-trimethylpent-1-ene units and from 5 to 15 mole percent of 2,4,4'-trimethylpent-2-ene units. They are obtained by polymerizing 50 parts by weight of maleic anhydride, from 35 to 180 parts by weight of 2,4,4'-trimethylpent-1-ene and from 0.6 to 6 parts by weight of 2,4,4'-trimethylpent2-ene per part by weight of 2,4,4'-trimethylpent-1-ene in the presence of a free-radical initiator at from 60° to 200° C. under a pressure of from 1 to 20 bar, and separating the terpolymer from the unconverted monomers. This result overcomes a definite technical prejudice, especially since Ange. Macromol. Chem., loc. cit., has disclosed a similar process, merely employing a different percentage monomer composition and special dispersants, by means of which only the 1-olefin forms copolymerized units.

The novel terpolymers constitute an enrichment of the art since their technological properties are equivalent to the prior art 1-olefin copolymers.

The starting monomers employed are MA and a diisobutylene mixture which comprises 2,4,4'-trimethylpent-1-ene and from 0.6 to 6 parts, preferably from 0.7 to 4 parts, of 2,4,4'-trimethylpent-2-ene per part of 2,4,4'-trimethylpent-1-ene.

The copolymerization may be carried out as a mass polymerization or a suspension polymerization.

In the latter, the diisobutylene mixture is used in excess over MA. For the purposes of the invention it is then preferred to employ, per 50 parts by weight of MA, from 35 to 180, preferably from 50 to 150, parts by weight of 2,4,4'-trimethylpent-1-ene, and from 0.6 to 6, preferably from 0.7 to 4, parts of 2,4,4'-trimethylpent-2-ene per part of 2,4,4'-trimethylpent-1-ene, with the proviso that the total diisobutylene mixture is present in an excess by weight over the MA.

In the case of a suspension polymerization, it is advantageous to employ a suitable dispersant. Poly(alkyl vinyl ethers), where alkyl is of 1 to 20 carbon atoms, have proved advantageous for this purpose.

Suitable free-radical initiators are the conventional organic free-radical initiators, such as dialkyl peroxides, alkyl hydroperoxides, diacyl peroxides, ketone peroxides, azo compounds and redox initiator systems. Examples are di-tertiary butyl peroxide, dicumyl peroxide, tert.-butyl hydroperoxide, cumene hydroperoxide, tert.-butyl perpivalate, tert.-butyl peroctoate, tert.-butyl perbenzoate, lauroyl peroxide, benzoyl peroxide, acetyl cyclohexanesulfonyl peroxide, isopropyl percarbonate, methyl ethyl peroxide, acetylacetone peroxide, azodiisobutyronitrile, azodicarboximide, and azodicarboxylic acid methyl ester or ethyl ester.

The amount of catalyst employed is usually from 0.01% to 5%, preferably from 0.1 to 2%, based on terpolymer formed.

Particularly suitable dispersants or protective colloids for the suspension polymerization are poly(alkyl vinyl ethers), where alkyl is of 1 to 20 carbon atoms, which have K-values of from 20 to 100, preferably from 40 to 80. Examples are poly(methyl vinyl ether), poly(ethyl vinyl ether), poly(butyl vinyl ether), poly(isobutyl vinyl ether), poly(dodecyl vinyl ether), poly(octadecyl vinyl ether) and mixtures of these, amongst which poly(ethyl vinyl ether) and poly(octadecyl vinyl ether) are particularly preferred. The protective colloid is in most cases employed in an amount of from 0.01 to 5%, preferably from 0.1 to 2%, based on the terpolymer.

The polymerization can be carried out batchwise or continuously, at from 60° to 200° C., preferably from 80° to 150° C., and under a pressure of from 1 to 20 bar, preferably from 1 to 10 bar.

The polymerization can also be carried out in the presence of conventional compounds which influence the size of the molecules, such as regulators, for example dodecylmercaptan, thiophenol, butyraldehyde and cyclohexene, and chain extenders containing 2 or more polymerizable groups in the molecule, for example butanediol divinyl ether, butanediol diacrylate, vinyl acrylate, divinylbenzene, divinyldioxane, pentaerythritol triallyl ether and polyallylsucrose. A suitable amount of regulator or chain extender is from 0.01 to 5%, preferably from 0.1 to 2.0%, based on the terpolymer formed.

The polymerization may be carried out in conventional stirred equipment, those having paddle stirrers or impeller stirrers being particularly suitable for suspension polymerization. The speed of stirring should be selected so that the maleic anhydride which is insoluble in the mixture of 2,4,4'-trimethylpent-1-ene and 2,4,4'-trimethylpent-2-ene is extremely finely suspended.

The resulting polymer suspensions range from mobile to slightly viscous, depending on the solids content, and contain spherical polymer paticles of from 0.5 to 10 μm diameter. An advantageous method of economically separating the terpolymers from the unconverted monomers is by spray-drying, but the fine particles can also readily be filtered off and then be dried in conventional dryers, for example paddle dryers. The polymer suspensions are particularly suitable for direct conversion of the copolymers into aqueous alkali metal salt solutions or ammonium salt solutions. For this purpose, water is added to the polymer suspension, the unconverted monomers are then distilled off by introducing steam into the mixture, and thereafter the mixture is neutralized with aqueous ammonia and/or alkali.

The unconverted monomers which are distilled off can, after phase separation from the water, be employed, preferably without additional purification, in the next polymerization. To obtain the concentrations according to the invention it is in that case necessary to replace not only maleic anhydride but also the 2,4,4'-trimethylpent-1-ene and 2,4,4'-trimethylpent-2-ene consumed in the preceding polymerization. As a rule, the amount of 2,4,4'-trimethylpent-1-ene to be added is greater than the amount of 2,4,4'-trimethylpent-2-ene to be added. Advantageously, mixtures of from about 20 to 30 parts by weight of 2,4,4'-trimethylpent-2-ene and from about 70 to 80 parts by weight of 2,4,4'-trimethylpent-1-ene are added.

On the other hand, mass polymerization is particularly suitable for the preparation of low molecular weight products. In constrast to the suspension polymerization, the mass polymerization must be carried out using MA and diisobutylene mixture in the equimolar ratio or with a very slight excess of diisobutylene. The terpolymer is obtained as a melt at 180°–200° C. The molten polymer is discharged from the reactor by conventional methods and is milled after it has cooled and solidified. In a preferred embodiment, aqueous alkali and/or aqueous ammonia is added under pressure to the hot melt, and an aqueous salt solution, which can be used directly, is thereby obtained.

The terpolymers according to the invention contain 50 mole percent of maleic anhydride, from 5 to 15 mole percent of 2,4,4'-trimethylpent-2-ene and from 35 to 45 mole percent of 2,4,4'-trimethylpent-1-ene, and have K-values of from 8 to 100, preferably from 10 to 60. The polymers obtained according to the invention can be employed, in the form of the anhydrides, as reactive components, for example in surface coatings, or can be employed in the form of their alkali metal salts and/or ammonium salts as dispersants for pigments, as paper sizes, as paper and wood coating agents, as finishes and the like.

The Examples which follow illustrate the invention. Parts are by weight. The K-values were determined by the method of H. Fikentscher, Cellulose-Chemie 13 (1932), 58–64 and 71–94. The measurements were carried out at 25° C. in 1% strength cyclohexanone solution.

EXAMPLE 1

600 parts of a mixture of 60% by weight of 2,4,4'-trimethylpent-1-ene and 40% by weight of 2,4,4'-trimethylpent-2-ene and 1.4 parts of a 70% strength solution in toluene of a poly(ethyl vinyl ether) having a K-value of 50 are introduced into a 2 liter stirred glass autoclave and the mixture is heated to 102° C., where it boils gently. 196 parts of liquid maleic anhydride and a solution of 8.4 parts of tertiary butyl peroctoate in 40 parts of a mixture of 60% by weight of 2,4,4'-trimethylpent-1-ene and 40% by weight of 2,4,4'-trimethylpent2-ene are then run in uniformly over 3 hours and thereafter the mixture is heated for a further hour at 102° C. 600 parts of distilled water are then added to the suspension, which contains polymer particles of size 3–6 μm, the excess olefin mixture is distilled off by passing steam into the mixture, and distillation is continued until the vapor temperature is 99° C. The aqueous polymer suspension obtained is dried in a spray dryer. The K-value of the polymer is 24.5. According to $^{13}$C NMR analysis the polymer contains from 9 to 10 mole percent of 2,4,4'-trimethylpent-2-ene.

The olefin mixture which has been distilled off is separated from the water by phase separation and is employed for the next polymerization batch.

EXAMPLE 2

357 parts of the olefin recycled from Example 1 (containing 49% by weight of 2,4,4'-trimethylpent-1-ene and 47% by weight of 2,4,4'-trimethylpent-2-ene), 243 parts of a mixture of 80% by weight of 2,4,4'-trimethylpent-1-ene and 20% by weight of 2,4,4'-trimethylpent-2-ene, and 1.4 parts of a 70% strength solution, in toluene, of a poly(ethyl vinyl ether) having a K-value of 50 are introduced into a 2 liter stirred glass autoclave, and the mixture is polymerized and worked up as described in Example 1. The terpolymer has a K-value of 24 and contains 9–10 mole percent of 2,4,4'-trimethylpent-2-ene.

EXAMPLE 3

1,820 parts of a mixture of 49% of 2,4,4'-trimethylpent-1-ene and 51% of 2,4,4'-trimethylpent-2-ene, and 6 parts of a poly(octadecyl vinyl ether) having a K-value of 40 are introduced into a 6 liter standard steel kettle equipped with a paddle stirrer, and the kettle is closed pressure-tight. The batch is then freed from atmospheric oxygen by forcing nitrogen to a pressure of 5 bars into the kettle, letting down again, and repeating this procedure twice. The batch is then heated to 140° C. whilst stirring at 170 rpm, at which temperature a pressure of 4 bar results, and 600 parts of maleic anhydride, heated to 70° C., are added in the course of 2 hours and, starting simultaneously, a solution of 24 parts of di-tertiary butyl peroxide in 150 parts of the above olefin mixture is added in the course of 3 hours. The mixture is then heated for a further 2 hours. The polymer obtained has a K-value of 21 and contains about 12 mole percent of 2,4,4'-trimethylpent-2-ene.

EXAMPLE 4

1,870 parts of a mixture of 40% by weight of 2,4,4'-trimethylpent-1-ene and 60% by weight of 2,4,4'-trimethylpent-2-ene, and 79 parts of maleic anhydride, are introduced into a 6 liter standard steel kettle equipped with an anchor stirrer, and the kettle is closed pressure-tight. The batch is then freed from atmospheric oxygen by forcing nitrogen to a pressure of 5 bars into the kettle, letting down again, and repeating this procedure twice, after which the contents of the kettle are heated to 180° C., at which temperature the pressure is 8 bar. 1,497 parts of liquid maleic anhydride are then added at 70° C. in the course of 2 hours, and a solution of 100 parts of di-tertiary butyl peroxide in 150 parts of a mixture of 40% by weight of 2,4,4'-trimethylpent-1-ene and 60% by weight of 2,4,4'-trimethylpent-2-ene is added over two hours. The mixture is then heated for a further 2 hours at 180° C., after which the unconverted olefin is distilled off. The liquid terpolymer melt is then poured out onto a cooled tray. The polymer has a K-value of 9 and contains 14–15 mole percent of 2,4,4'-trimethylpent-2-ene.

We claim:

1. A terpolymer which has a Fikentscher K-value of from 8 to 100 and which comprises 50 mole percent of maleic anhydride units, from 35 to 45 mole percent of 2,4,4'-trimethylpent-1-ene units and from 5 to 15 mole percent of 2,4,4'-trimethylpent-2-ene units.

2. A process for the preparation of a terpolymer as claimed in claim 1, wherein 50 parts by weight of maleic anhydride, from 35 to 180 parts by weight of 2,4,4'-trimethylpent-1-ene and from 0.6 to 6 parts by weight of 2,4,4'-trimethylpent-2-ene per part by weight of 2,4,4'-trimethylpent-1-ene are polymerized in the presence of a free radical initiator at from 60° to 200° C. and a pressure of from 1 to 20 bar and the terpolymer is separated from the unconverted monomers.

3. A process as claimed in claim 2, wherein the unconverted alkenes are employed in subsequent polymerization processes, with the addition of monomers to replace the monomers consumed in the preceding polymerization.

* * * * *